United States Patent
Fujinawa et al.

(10) Patent No.: US 7,260,751 B2
(45) Date of Patent: Aug. 21, 2007

(54) INFORMATION PROVISION FOR NOTIFYING PERIPHERAL DEVICE OF ABNORMALITY BY DISPLAYING A STORAGE LOCATION FOR INFORMATION CORRESPONDING TO ABNORMALITY IN PERIPHERAL DEVICE

(75) Inventors: Osamu Fujinawa, Niigata (JP); Katsuya Yamasaki, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 393 days.

(21) Appl. No.: 10/867,698

(22) Filed: Jun. 16, 2004

(65) Prior Publication Data

US 2005/0198223 A1    Sep. 8, 2005

(30) Foreign Application Priority Data

Dec. 24, 2003   (JP)   .............................. 2003-427514

(51) Int. Cl.
*G06F 11/00* (2006.01)

(52) U.S. Cl. .............................. 714/47; 714/48; 710/15

(58) Field of Classification Search .................. 714/47, 714/48; 710/15
See application file for complete search history.

(56) References Cited

U.S. PATENT DOCUMENTS

| 2003/0172148 | A1* | 9/2003 | Simpson et al. | ............. 709/224 |
| 2004/0153868 | A1* | 8/2004 | Nonaka et al. | ................ 714/47 |
| 2005/0105135 | A1* | 5/2005 | Takahashi | .................. 358/1.18 |

FOREIGN PATENT DOCUMENTS

JP          A 11-353145          12/1999

* cited by examiner

*Primary Examiner*—Donald Sparks
*Assistant Examiner*—Harold Kim
(74) *Attorney, Agent, or Firm*—Oliff & Berridge, PLC (57) ABSTRACT

An information provision method for providing information to deal with an abnormality occurred in a peripheral device, comprising: notifying the abnormality to a host apparatus which controls the peripheral device, obtaining a storage location for information corresponding to the abnormality occurred in the peripheral device from a database which holds the storage location for information corresponding to the abnormality, obtaining information located in the storage location from a server, and displaying the information obtained from the server on a display terminal of the host apparatus.

20 Claims, 8 Drawing Sheets

| EVENT INFO | URL |
|---|---|
| COVER OPEN | http://www.***.com/CO |
| NO PAPER | http://www.***.com/NP |
| PAPER JAM | http://www.***.com/PJ |
| : | : |

INFORMATION PROVISION FOR NOTIFYING PERIPHERAL DEVICE OF ABNORMALITY BY DISPLAYING A STORAGE LOCATION FOR INFORMATION CORRESPONDING TO ABNORMALITY IN PERIPHERAL DEVICE

BACKGROUND OF THE INVENTION

1. Field of the Invention

The present invention relates to an information provision method and system, and more particularly to an information provision method capable of providing information for dealing with an event such as a paper jam occurred in a device such as a printer, and a system therefor.

2. Description of the Related Art

PCs (personal computers) are often connected with a printer for printing out sentences and images and a scanner for copying characters and images which are printed on a medium such as, for example, paper, and such peripheral devices are also connected to a LAN (local area network) to which plural PCs are connected and commonly used by the plural PCs.

It is known to provide a system that a control device for controlling peripheral devices is often determined to connect the peripheral devices to the LAN; for example, when an abnormality occurs in a peripheral device, the control device monitors the abnormality intensively and, when the abnormality is not remedied for a long period, notifies information about the occurred abnormality to an integrated monitoring device which is provided at the manufacturer of the peripheral device suffering from the abnormality through the Internet, and an operator of the integrated monitoring device supports by sending a maintenance personnel, or the like.

SUMMARY OF THE INVENTION

The present invention provides an information provision method and system therefor that, when an abnormality such as, for example, a paper jam, a lack of toner or the like, occurs, a user can easily and appropriately obtain information necessary to remedy the abnormality.

An aspect of the present invention provides an information provision method for providing information to deal with an abnormality occurred in a peripheral device, including: notifying the abnormality to a host apparatus which controls the peripheral device, and obtaining a storage location for information corresponding to the abnormality occurred in the peripheral device from a database which holds the storage location for information corresponding to the abnormality, obtaining information located in the storage location from a server, and displays the information obtained from the server on a display terminal of the host apparatus.

Another aspect of the present invention provides an information provision system for providing information for dealing with an abnormality occurred in a peripheral device, including: the peripheral device including a notification unit that notifies the abnormality to a host apparatus which controls the peripheral device, and the host apparatus including: a database that holds a URL of a Web page showing information corresponding to the abnormality of the peripheral device, a URL acquisition unit that obtains the URL of the Web page showing information corresponding to the abnormality occurred in the peripheral device from the database, an acquisition unit that obtains the URL of a Web page showing information corresponding to the abnormality, a Web browser activation unit that activates a Web browser, and a display unit that displays information, which is shown on the Web page, on a display terminal.

Still another aspect of the present invention provides a host apparatus, including: a database that holds a storage location for information corresponding to an abnormality occurred in a peripheral device, a receiving unit that receives the abnormality occurred in the peripheral device, a unit that obtains a storage location for information corresponding to the abnormality received by the receiving unit from the database, and a display unit that displays information stored in the storage location for the information.

The present invention can provide users with information necessary to eliminate any events.

BRIEF DESCRIPTION OF THE DRAWINGS

Preferred embodiments of the present invention will be described in detail based on the following figures, wherein.

DESCRIPTION OF THE EMBODIMENTS

Preferred embodiments of the information provision method and system according to the present invention will be described in detail with reference to the accompanying drawings.

Figure 1:
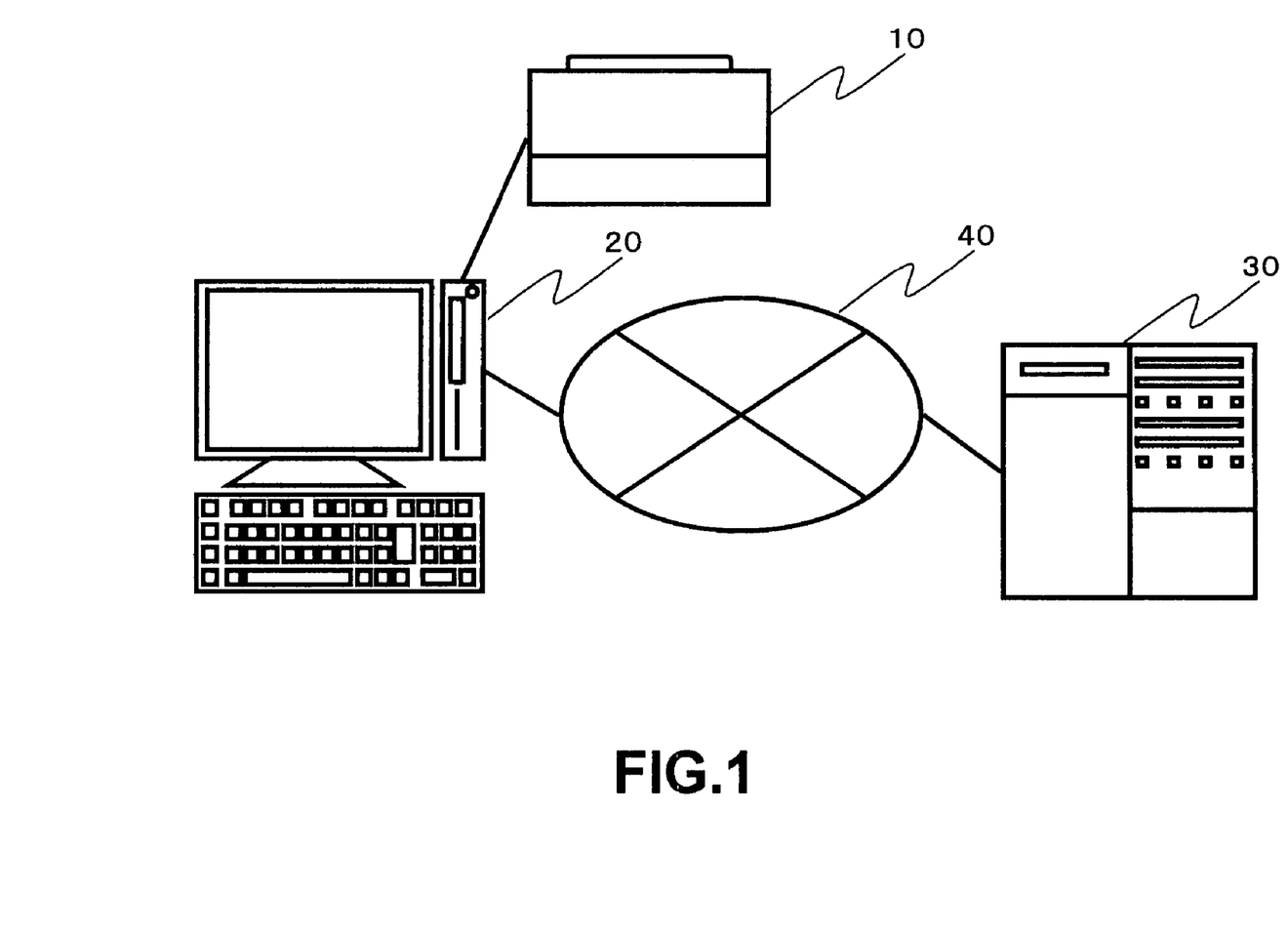
FIG. 1 is a conceptual diagram showing an example structure of the information provision system according to the present invention.

FIG. 1 is a conceptual diagram showing an example structure of an information provision system according to the present invention. As shown in FIG. 1, the information provision system according to the present invention comprises a printer 10 as a peripheral device, a PC 20 as a host apparatus for controlling peripheral device, and a Web server 30 which is configured a Web site having a Web page for providing information necessary to deal with an abnormality such as a paper jam or a lack of toner occurred in the printer 10 by using the contents such as animations, voice and text. And, the PC 20 and the Web server 30 are connected through the Internet network (broadband network) 40.

Figure 2:
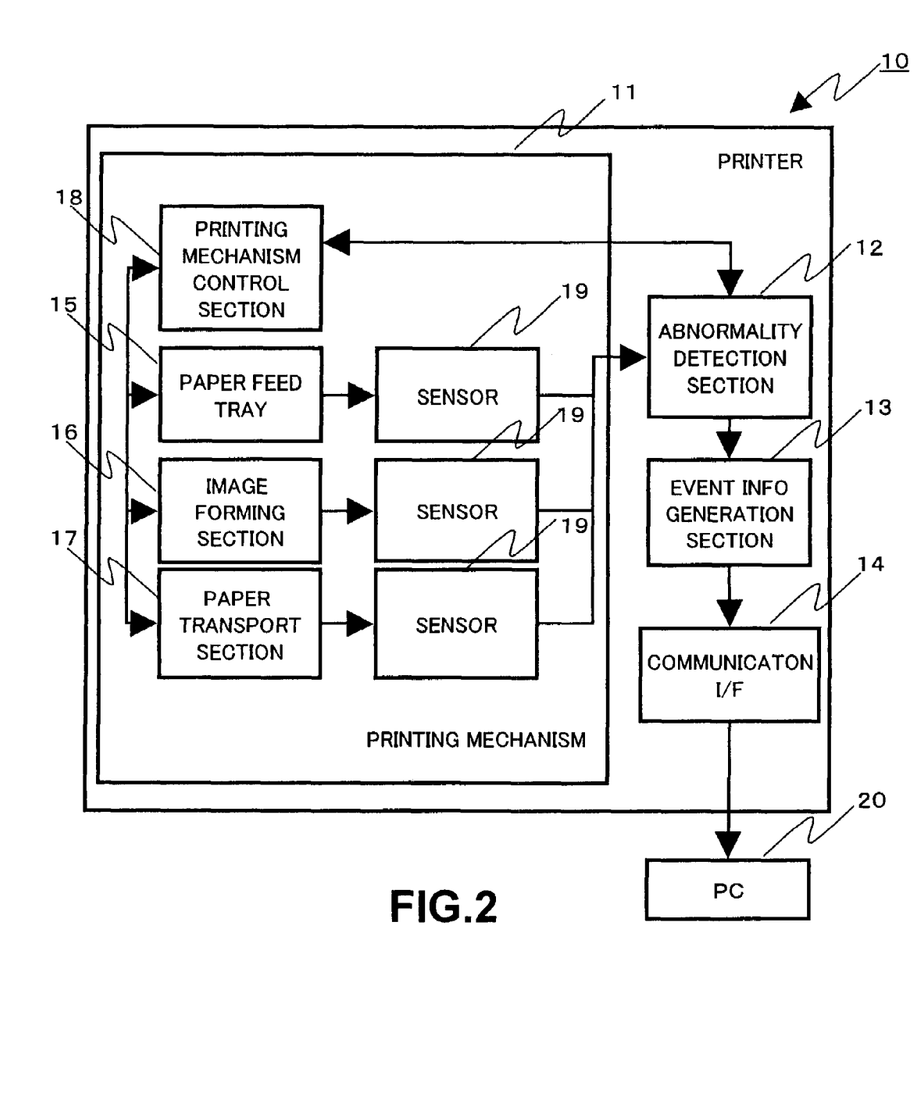
FIG. 2 is an outline block diagram showing an example structure of a printer 10 according to the present invention.

FIG. 2 is an outline block diagram showing an example structure of the printer 10 according to the present invention. As shown in FIG. 2, the printer 10 is provided with a printing mechanism 11 for printing out an image on paper, an abnormality detection section 12 for detecting an abnormality occurred in the printer, an event information generation section 13 for generating event information to notify the host apparatus PC of the abnormality detected by the abnormality detection section 12, and a communication interface (I/F) 14 for sending the event information to the PC 20.

The printing mechanism 11 is provided with a paper feed tray 15 for storing paper on which an image is printed, an image forming section 16 for forming an image by printing out the image on paper, a paper transport section 17 which transports paper stored in the paper feed tray 15 to the image forming section 16 and ejects the image-printed paper out of the printer 10, and a printing mechanism control section 18 for controlling to print out an image.

The paper feed tray 15, the image forming section 16, the paper transport section 17 and a cover opening section (not shown) at various portions of the printer 10 are provided with sensors 19 for detecting abnormalities such as a paper jam, a lack of toner, cover opening and the like.

Here, the abnormality detection section 12 uses information accumulated by the sensors 19 and control logic to detect an abnormality, and the abnormalities detected by the abnormality detection section 12 include recoverable alarms (cover opening, a paper jam, out of paper, etc.), unrecoverable alarms (a hardware (HW) failure, a communication failure, etc.), and consumable item information (no/low remaining amount of toner, a drum unit life, an EP cartridge life, etc.).

The event information generation section 13 edits detailed information about the abnormality detected by the abnormality detection section 12 to prepare event information. For example, when a paper jam occurs, the event information generation section 13 prepares event information to notify where paper is jammed and, when a cover is left open, it prepares event information to notify which cover is open.

At this time, information such as a printer identification number (ID), a model number, a type and the like used for identification may be added to the event information.

And, when the abnormality detection section detects the occurrence of an abnormality in the printer 10, event information for notifying the detected event to the host apparatus PC is prepared by the event information generation section and sent to the PC through a communication I/F.

Figure 3:
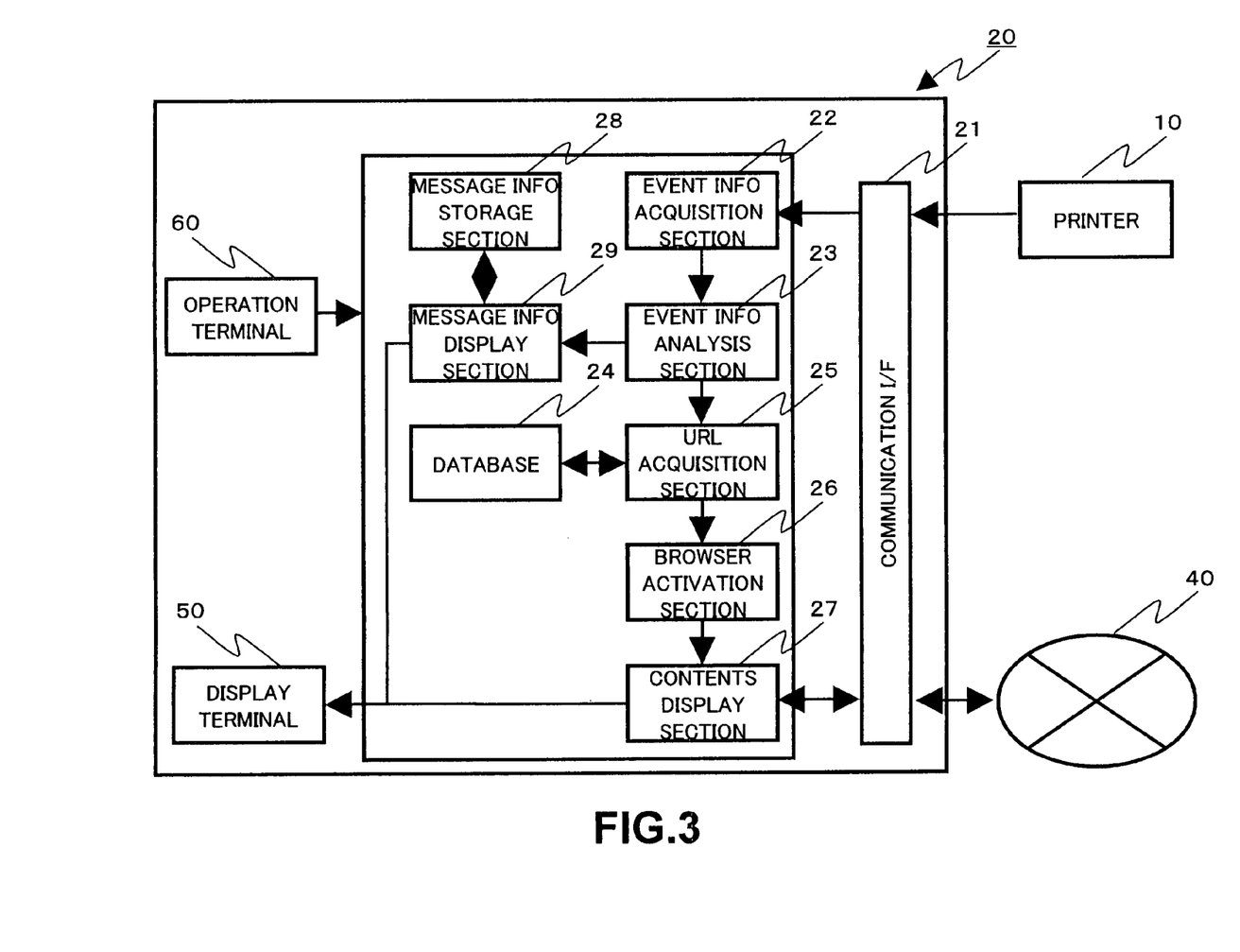
FIG. 3 is an outline block diagram showing an example structure of a PC according to the present invention.
Figure 4:
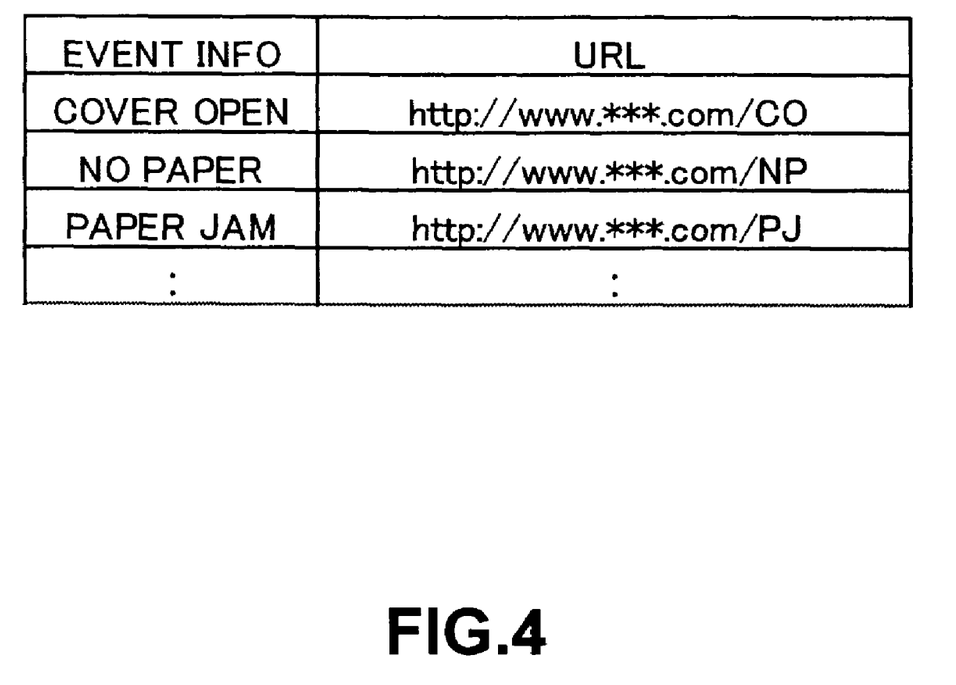
FIG. 4 is a diagram showing an example of a look up table.

FIG. 3 is an outline block diagram showing an example structure of the PC 20 according to the present invention. As shown in FIG. 3, the PC 20 is provided with a display terminal 50 such as a display, operation terminals 60 such as a keyboard and a mouse, a communication I/F 21 for sending/receiving event information, contents information or the like, an event information acquisition section 22 for receiving event information through the communication I/F 21, an event information analysis section 23 for analyzing the event information, a database 24 having a look up table which correlates the abnormality notified as the event information with the URL of a Web page showing the contents corresponding to the abnormality as shown as an example in FIG. 4, a URL acquisition section 25 for obtaining the URL of the Web page corresponding to the event information from the database 24, a browser activation section 26 for activating a Web browser, a content display section 27 for displaying the contents, which are shown on the Web page of the URL obtained by the URL acquisition section 25, on the display terminal 50, a message information storage section 28 for storing message information corresponding to the event information, and a message information display section 29 for displaying message information corresponding to the event information on the display terminal 50.

Here, the event information analysis section 23 analyzes the event information and judges whether the Web browser is activated to access the Web page.

For example, it is previously determined according to the abnormality to be notified by the event information whether the Web page is accessed, and when the received event information is pertinent, it is judged to activate the Web browser, and when it is not pertinent, it is judged not to activate the Web browser, and message information stored in the message information storage section is displayed.

The content display section 27 accesses the Web page of the URL obtained by the URL acquisition section 25 through the communication I/F 21 and the Internet network 40 and displays the information, which is provided by using the contents such as animations, voice and text, on the display terminal 50.

Figure 5:
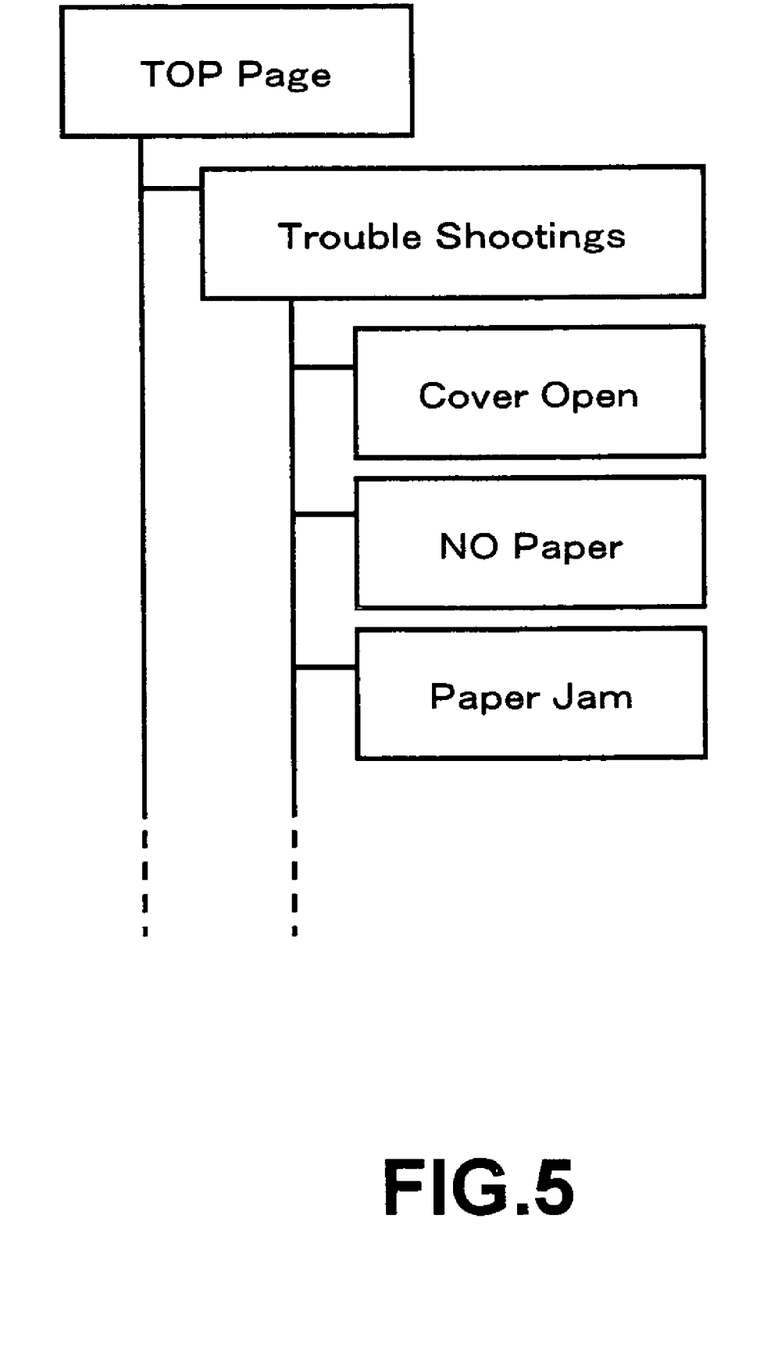
FIG. 5 is a diagram showing an example structure of a Web site.

Here, the Web server showing the Web page stores user support information for supporting the users, and each content forms hierarchy and is stored by category.

For example, as shown in FIG. 5, it is configured that all error information about the printer is compiled on a page of troubleshooting or the like, and even if the user does not have a printer, necessary information can be obtained by seeing from the top page.

The message information storage section 28 stores message information, such as text and illustration, indicating a method how a relatively simple abnormality occurred in the printer is remedied by the user.

This message information is information previously stored in, for example, a CD-ROM or the like attached to the printer at the time of buying it but may be updated information about the message information provided from the Web site through the Internet network.

As the message information storage section, a storage medium in which message information is stored, such as a CD-ROM or the like attached to the printer, may be used.

The message information display section 29 obtains message information corresponding to the event information from the message information storage section 28 and displays on the display terminal 50. As a method of displaying the message information, for example, a method of displaying the message information by popping up a display screen (Window) may be employed.

When the PC 20 receives the event information, the event information is analyzed by the event information analysis section to determine whether the Web browser is activated.

Here, when it is determined to activate the Web browser, the PC 20 refers to the look up table stored in the database to obtain the URL of a Web page corresponding to the event information from the database and accesses the obtained URL to display the contents, which are shown on the Web page, on the display terminal.

When it is determined not to activate the Web browser, the message information corresponding to the event information is obtained from the message information storage section and displayed in a Window.

In the information provision system configured as described above according to the present invention, when an abnormality such as a paper jam occurs in the printer, the abnormality detection section detects the occurrence of the abnormality, and the event information preparation section prepares event information for notifying the detected abnormality and sends the event information to the host apparatus PC.

The PC analyzes the received event information by the event information analysis section to determine whether the Web browser is activated or not, refers to the look up table when it is determined to activate the Web browser so to obtain the URL of a Web page corresponding to the event information, and accesses the Web page of the obtained URL to display the contents, which are shown on the Web page, on the display terminal.

When it is determined not to activate the Web browser, message information corresponding to the event information is obtained from the image information stored in the message information storage section, and the obtained message information is displayed in the Window.

Figure 6:
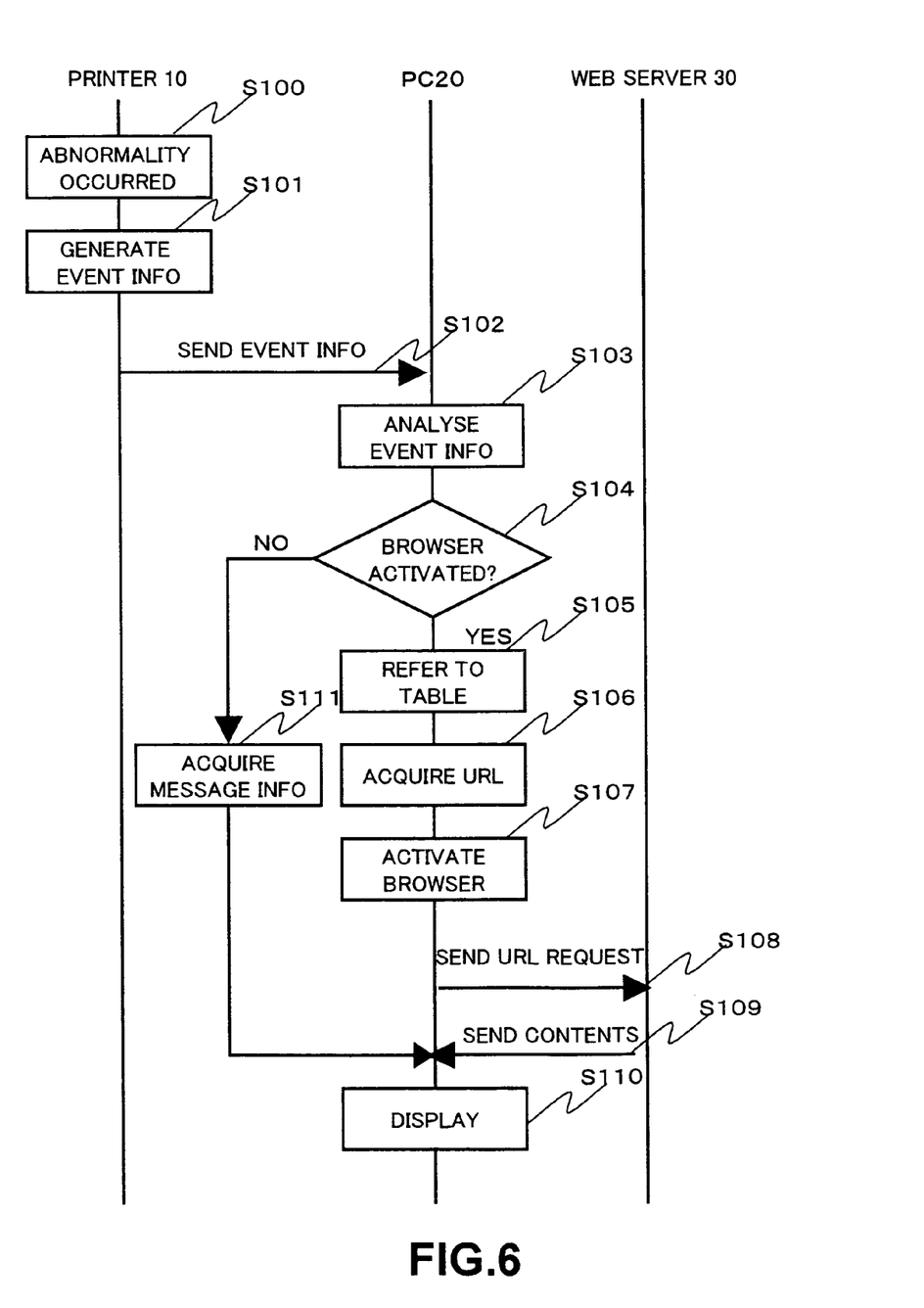
FIG. 6 is a flow chart showing a flow of the information provision method according to a first embodiment of the present invention.

FIG. 6 is a flow chart showing a flow of the information provision method according to a first embodiment. First, when an abnormality occurs in the printer 10 (step 100), event information corresponding to the occurred abnormality is prepared (step 101) and sent to the PC 20 (step 102).

And, the PC 20 analyzes the received event information (step 103) and determines whether the Web browser is activated or not (step 104). When it is determined to activate the Web browser (YES in step 104), the PC 20 refers to the look up table (step 105), obtains the URL of a Web page showing information corresponding to the abnormality notified as the event information (step 106), activates the Web browser (step 107) and sends a URL request to the Web server 30 (step 108).

The Web server 30 sends the contents shown on the Web page of the requested URL to the PC 20 (step 109), and the PC 20 displays the received contents on the display terminal (step 110).

When it is determined not to activate the Web browser (NO in step 104), message information corresponding to the abnormality notified as the event information is obtained from the message information storage section (step 111), and the obtained message information is displayed on the display terminal (step 110).

In the first embodiment, the Web page showing the contents for remedying the abnormality occurred in the printer is accessed. For example, when a remaining amount of toner or ink is small or when an abnormality such as a drum unit life, an EP life or the like which has not occurred actually but has a high possibility of occurrence in near future, a Web page, such as one which accepts an order for toner on line, which shows contents to prepare for any abnormalities may be accessed.

Because parts inevitable to remedy an abnormality, such as an exchange cartridge for toner or ink, can be prepared in advance before the occurrence of the abnormality, it is possible to remedy the abnormality quickly, and because a part required for remedying an abnormality can be ordered from a Web page, the user can easily and quickly prepare the part required for remedying the abnormality.

When an abnormality, such as a failure of the printer, which is hardly solved by a user occurs, a web page used to request its repair may be accessed, or a contact address and a repair requesting procedure may be shown on the screen.

Because a repair request to an appropriate party such as a manufacturer can be made quickly and easily, even a user who cannot solely deal with the abnormality can remedy the abnormality quickly and easily.

In the first embodiment, because the Web site covering the information described in the attached manual is accessed, such information can be used as alternative information even if the manual provided as a CD-ROM or a booklet is not at hand.

Even when the attached manual is installed as an electronic manual in the PC, it generally takes time to retrieve necessary information from a large volume of information. But, because a URL of a deep hierarchy of the Web site is directly indicated, it is not necessary to see around the Web site to seek for necessary information. Besides, because the contents are shown on the Web page, the update of the contents is easily and quickly reflected on the Web page, so that the user can always obtain the latest information with ease.

In addition, because information can be provided to the user by using animations such as video contents through the Internet network (broadband network), the user watches the animations displayed through the Web browser and repeats the same operation to easily remove the paper jammed in the printer, to set paper in the paper tray, to exchange the toner, to exchange the drum unit, to exchange the RP cartridge, or the like. Besides, such an operation can be conducted while minimizing a possibility of damaging the printer body.

In the first embodiment, when it is determined to activate the activation browser by analyzing the event information, the URL is obtained to activate the Web browser, but when the user does not allow the activation of the Web browser, it is also possible to display the image information in the Window. Description will be made with reference to FIG. 7.

Figure 7:
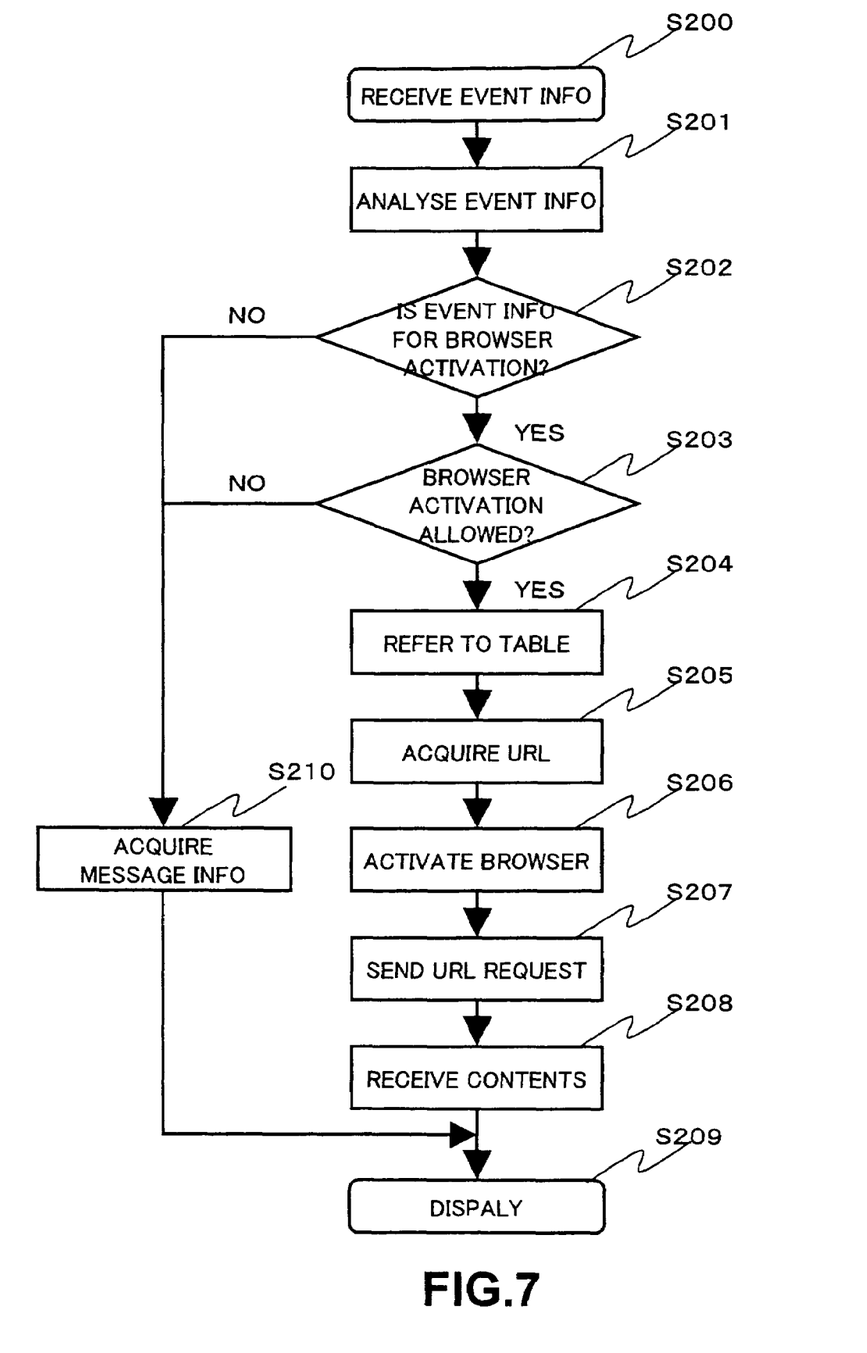
FIG. 7 is a flow chart showing a flow of the information provision method according to a second embodiment of the present invention.

First, when the event information sent from the printer is received (step 200), the received event information is analyzed (step 201), and it is determined whether it is event information for activating a Web browser (step 202).

And, when it is determined not to be event information for activating the Web browser (NO in step 202), message information corresponding to the event information is obtained (step 210), and the obtained message is displayed on the display terminal (step 209).

When it is determined to be event information for activating the Web browser (YES in step 202), it is determined whether the user allows the activation of the Web browser (step 203).

Here, when it is determined that the activation of the Web browser is allowed (YES in step 203), the look up table is referred to (step 204), a URL is obtained (step 205), the Web browser is activated (step 206), a URL request is sent to the Web server (step 207), the contents are received (step 208), and the received contents are displayed on the display terminal (step 209).

Meanwhile, when it is determined that the activation of the Web browser is not allowed (NO in step 203), message information corresponding to the abnormality notified as the event information is obtained from the message information storage section (step 210), and the obtained message information is displayed on the display terminal (step 209).

It is determined whether the activation of the browser is allowed or not by a method of displaying a screen requesting the confirmation on the display terminal to determine according to an instruction by the user before the browser is activated, by the user who previously sets not to activate, or by the user who uses a selected function.

It can also be configured to display a message on the display terminal without activating the browser, to dispose a button for activating the browser in the displayed contents, and to judge the activation of the browser by the user. Description will be made below with reference to FIG. 8.

Figure 8:
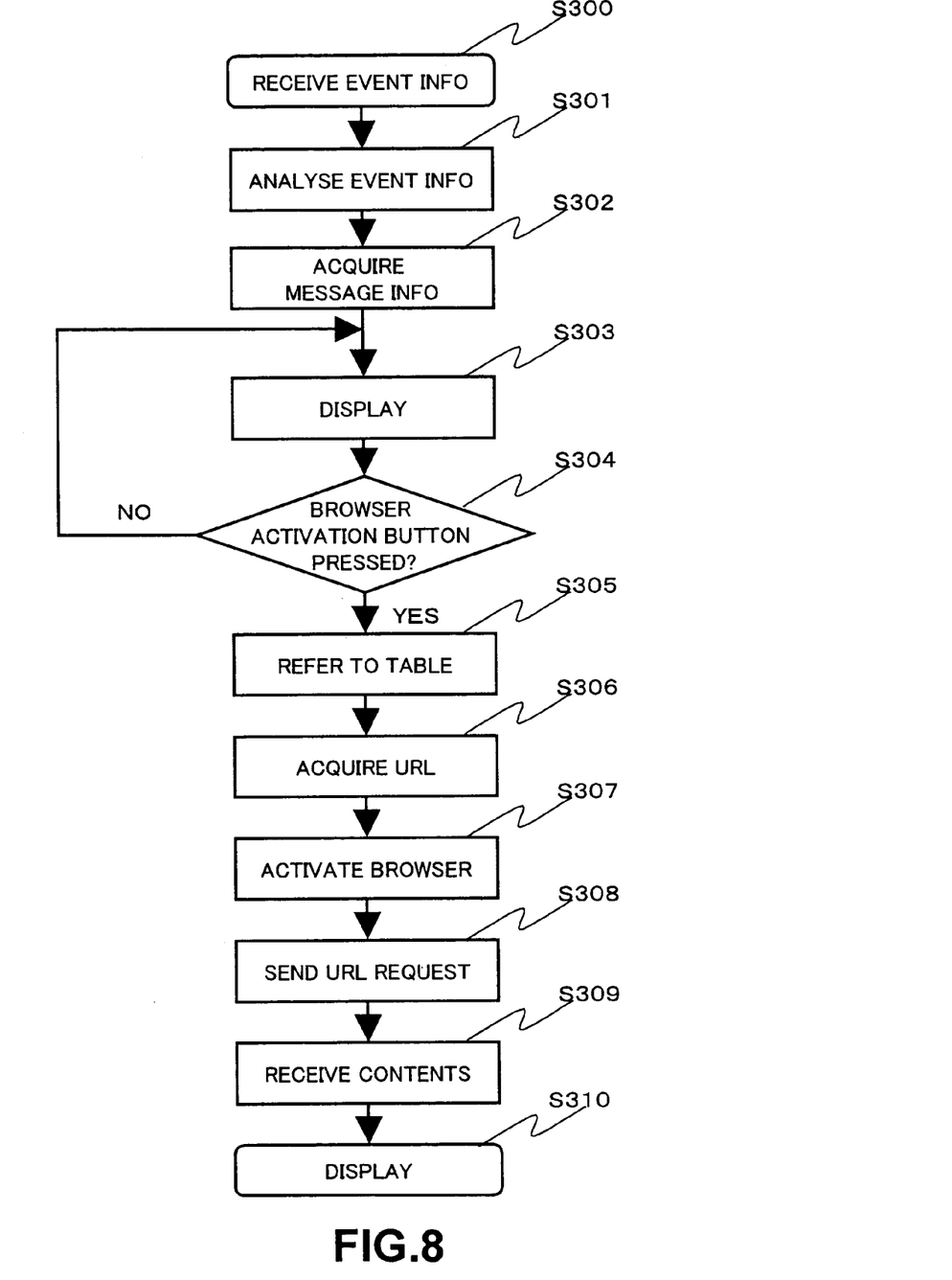
FIG. 8 is a flow chart showing a flow of the information provision method according to a third embodiment of the present invention.

First, when the event information sent from the printer is received (step 300), the received event information is analyzed (step 301), corresponding message information is obtained from the message information storage section (step 302), and the obtained message is displayed on the display terminal (step 303).

And, the message to be displayed contains a browser activation icon, and when the activation icon is pressed (YES in step 304), the look up table is referred to (step 305), a URL is obtained (step 306), a Web browser is activated (step 307), a URL request is sent to the Web server (step 308), contents are received (step 309), and the received contents are displayed on the display terminal (step 310).

According to the third embodiment, the activation of the Web browser can be limited according to the user's desire, so that even for event information for providing information by activating the Web browser, message information can be provided by using a Window to a user not requiring the provision of information using the Web browser.

What is claimed is:

1. An information provision method for providing information to deal with an abnormality in a peripheral device, comprising:
    notifying a host apparatus which controls the peripheral device of the abnormality;
    obtaining a storage location for information corresponding to the abnormality in the peripheral device from a database which holds the storage location for information corresponding to the abnormality;
    obtaining information located in the storage location from a server;
    determining whether the information located in the storage location and obtained from the server is based on the abnormality; and
    displaying the information obtained from the server on a display terminal of the host apparatus.

2. The information provision method according to claim 1, further comprising:
    obtaining information corresponding to the abnormality from a storage unit located in the host apparatus that stores the information corresponding to the abnormality of the peripheral device when the information located in the storage location is not obtained from the server; and
    displaying the information obtained from the storage unit on the display terminal.

3. The information provision method according to claim 1, wherein the information displayed on the display section is a Web page.

4. The information provision method according to claim 2, wherein the information displayed on the display section is a Web page.

5. The information provision method according to claim 1, wherein the information displayed on the display section is animation.

6. The information provision method according to claim 2, wherein the information displayed on the display section is animation.

7. The information provision method according to claim 3, wherein the Web page is a Web page for selling parts for the peripheral device, and the information displayed on the display section is information for ordering the parts.

8. The information provision method according to claim 4, wherein the Web page is a Web page for selling the parts for the peripheral device, and the information displayed on the display section is information for ordering the parts.

9. The information provision method according to claim 3, wherein the Web page is a Web page for receiving a request for repairing the peripheral device, and the information displayed on the display section is information for requesting the repair.

10. The information provision method according to claim 3, wherein the Web page is a Web page for receiving a request for repairing the peripheral device, and the information displayed on the display section is information for requesting the repair.

11. An information provision system for providing information for dealing with an abnormality in a peripheral device, comprising:
    the peripheral device comprising a notification unit that notifies a host apparatus which controls the peripheral device of the abnormality; and
    the host apparatus comprising:
        a database that holds a URL of a Web page showing information corresponding to the abnormality of the peripheral device;
        a URL acquisition unit that obtains the URL of the Web page showing information corresponding to the abnormality in the peripheral device from the database;
        an acquisition unit that obtains information shown on the web page of the URL;
        a Web browser activation unit that activates a Web browser;
        a judging unit that judges whether the Web browser is activated based on the abnormality; and
        a display unit that displays information, which is shown on the Web page, on a display terminal.

12. The information provision system according to claim 11, the host apparatus further comprising:
    a storage unit that holds information corresponding to the abnormality of the periphery device;
    an acquisition unit that obtains information corresponding to the abnormality from the storage unit when the Web browser is not activated; and
    a display unit that displays the information obtained from the storage unit on the display terminal.

13. The information provision system according to claim 11, wherein the information displayed on the display unit is animation.

14. The information provision system according to claim 12, wherein the information displayed on the display unit is animation.

15. The information provision system according to claim 11, wherein the Web page is a Web page for selling parts for the peripheral device, and the information displayed on the display unit is information for ordering the parts.

16. The information provision system according to claim 12, wherein the Web page is a Web page for selling parts for the peripheral device, and the information displayed on the display unit is information for ordering the parts.

17. The information provision system according to claim 11, wherein the Web page is a Web page for receiving a request for repairing the peripheral device, and the information displayed on the display unit is information for requesting the repair.

18. The information provision system according to claim 12, wherein the Web page is a Web page for receiving a request for repairing the peripheral device, and the information displayed on the display unit is information for requesting the repair.

19. A host apparatus, comprising:
   a database that holds a storage location for information corresponding to an abnormality in a peripheral device,
   a receiving unit that receives the abnormality in the peripheral device from the data base,
   a unit that obtains a storage location for information corresponding to the abnormality received by the receiving unit;
   a judging unit that judges whether a Web browser is activated based on the abnormality; and
   a display unit that displays information stored in the storage location.

20. The host apparatus according to claim 19, further comprising a receiving unit for receiving information from outside stored in the storage location, wherein the display unit displays the information received by the receiving unit.

* * * * *